(12) United States Patent
Lee

(10) Patent No.: US 12,148,424 B2
(45) Date of Patent: Nov. 19, 2024

(54) DISPLAY DEVICE AND ARTIFICIAL INTELLIGENCE SERVER CAPABLE OF CONTROLLING HOME APPLIANCE THROUGH USER'S VOICE BASED ON PURCHASE HISTORY LIST

(71) Applicant: LG ELECTRONICS INC., Seoul (KR)

(72) Inventor: Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 370 days.

(21) Appl. No.: 17/625,977

(22) PCT Filed: Aug. 16, 2019

(86) PCT No.: PCT/KR2019/010447
§ 371 (c)(1),
(2) Date: Jan. 10, 2022

(87) PCT Pub. No.: WO2021/033785
PCT Pub. Date: Feb. 25, 2021

(65) Prior Publication Data
US 2022/0254345 A1    Aug. 11, 2022

(51) Int. Cl.
| | |
|---|---|
| G10L 15/22 | (2006.01) |
| D06F 34/30 | (2020.01) |
| G05B 19/042 | (2006.01) |
| G06F 3/14 | (2006.01) |
| G10L 15/18 | (2013.01) |
| G10L 15/30 | (2013.01) |
| H04N 21/41 | (2011.01) |

(52) U.S. Cl.
CPC ............ *G10L 15/22* (2013.01); *G05B 19/042* (2013.01); *G06F 3/14* (2013.01); *G10L 15/1815* (2013.01); *G10L 15/30* (2013.01); *G05B 2219/23386* (2013.01); *G10L 2015/223* (2013.01); *G10L 2015/225* (2013.01); *G10L 2015/228* (2013.01)

(58) Field of Classification Search
CPC .......................... H04N 21/41265; D06F 34/30
See application file for complete search history.

(56) References Cited

U.S. PATENT DOCUMENTS

| | | | | |
|---|---|---|---|---|
| 2008/0059178 A1* | 3/2008 | Yamamoto | ....... | H04N 21/41265 704/E15.005 |
| 2016/0225372 A1 | 8/2016 | Cheung et al. | | |

FOREIGN PATENT DOCUMENTS

| | | | | |
|---|---|---|---|---|
| CN | 111676658 | * | 2/2019 | ............. D06F 34/30 |
| KR | 10-2011-0137614 A | | 12/2011 | |

(Continued)

*Primary Examiner* — Farzad Kazeminezhad
(74) *Attorney, Agent, or Firm* — Birch, Stewart, Kolasch & Birch, LLP

(57) ABSTRACT

A display device for controlling a home appliance by using voice recognition according to an embodiment of the present invention includes a display unit, a wireless communication unit configured to wirelessly communicate with the home appliance, and a control unit configured to: receive a voice command; when the intention of the received voice command is to request an object handling method, determine an operation mode of the home appliance for handling an object based on information of the object; and transmit, to the home appliance, a control command for operating the home appliance in the determined operation mode.

14 Claims, 17 Drawing Sheets

(56) References Cited

FOREIGN PATENT DOCUMENTS

| KR | 10-2014-0095779 A | 8/2014 |
|----|-------------------|--------|
| KR | 10-2015-0028177 A | 3/2015 |
| KR | 10-2016-0132457 A | 11/2016 |
| KR | 10-2017-0103548 A | 9/2017 |
| KR | 10-2019-0081856 A | 7/2019 |
| WO | 2017/097112 A1 | 6/2017 |

* cited by examiner

FIG. 8
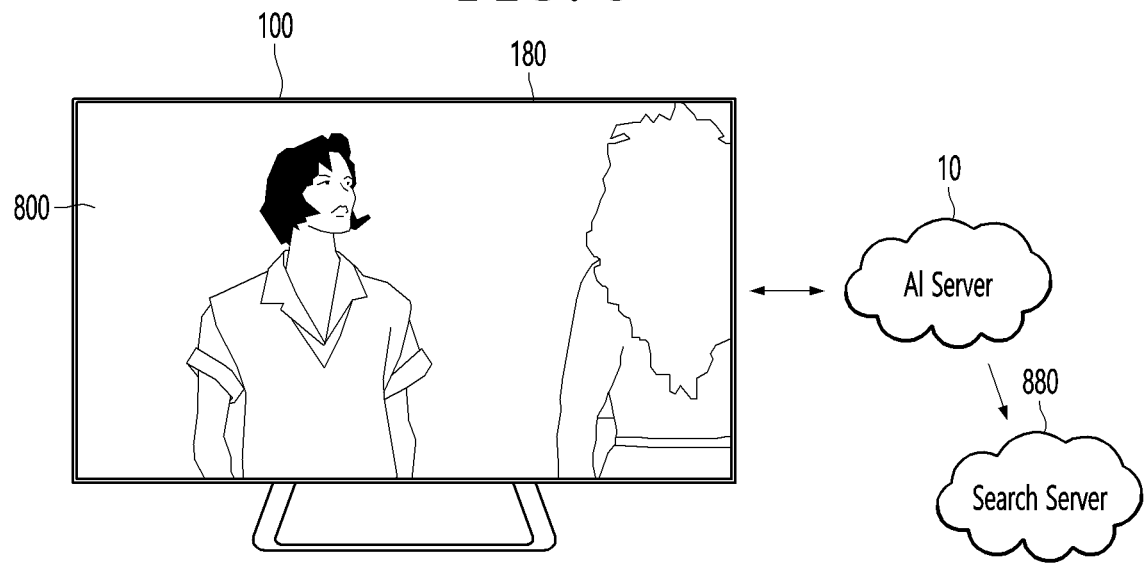
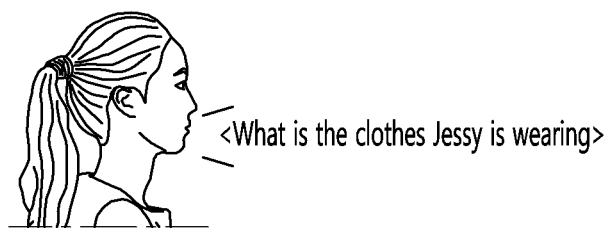

FIG. 12
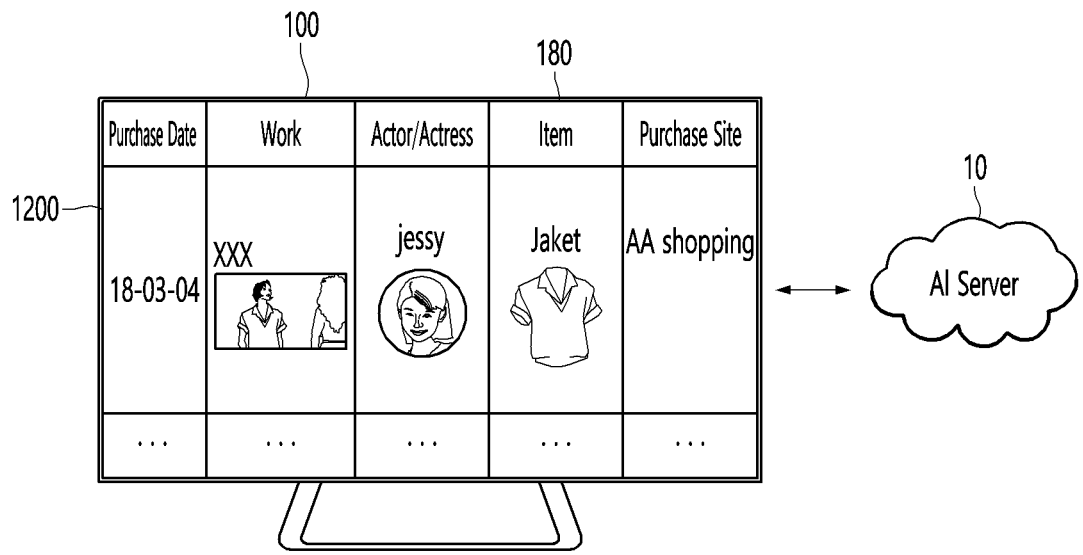
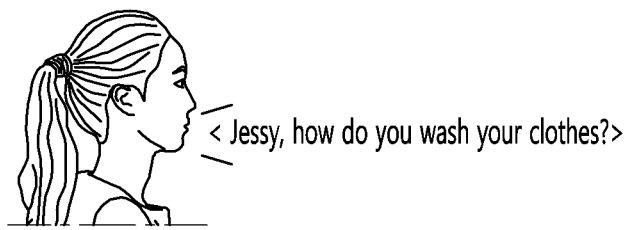
< Jessy, how do you wash your clothes?>
FIG. 13
1300
| Washing | Drying | Styler | Handling Precautions |
|---|---|---|---|
| 1. Dry cleaning<br>2. Use laundry net during machine washing<br>3. Wool/knit mode | 1. Do not leave in wet conditions<br>2. Wool/delicate mode | Wool/knit mode | Do not use bleach and enzyme detergent. |

FIG. 17
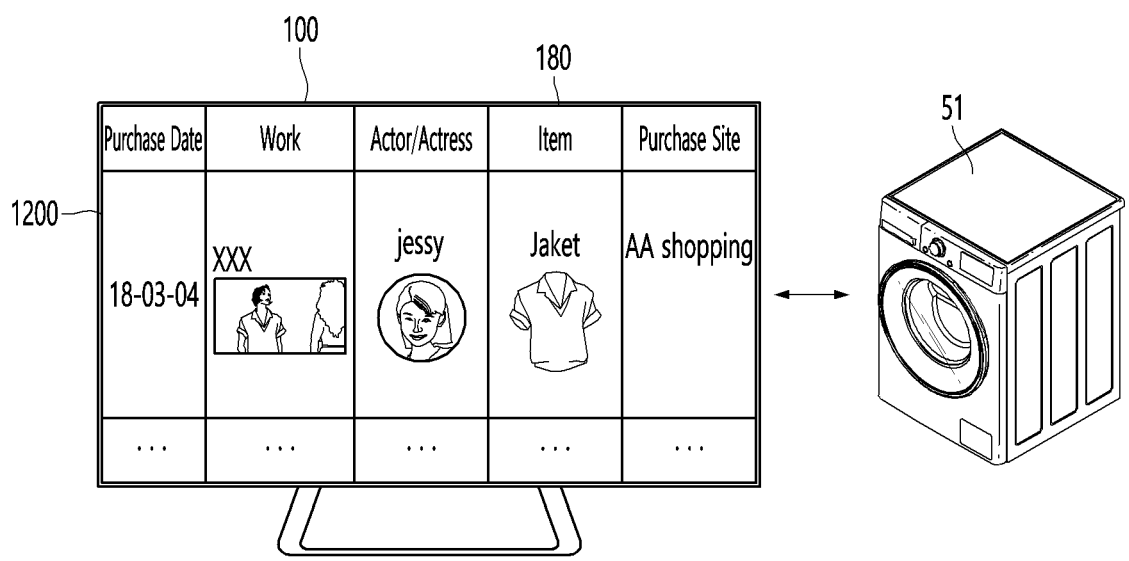
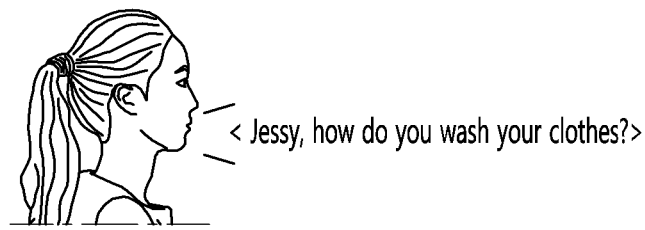

FIG. 18
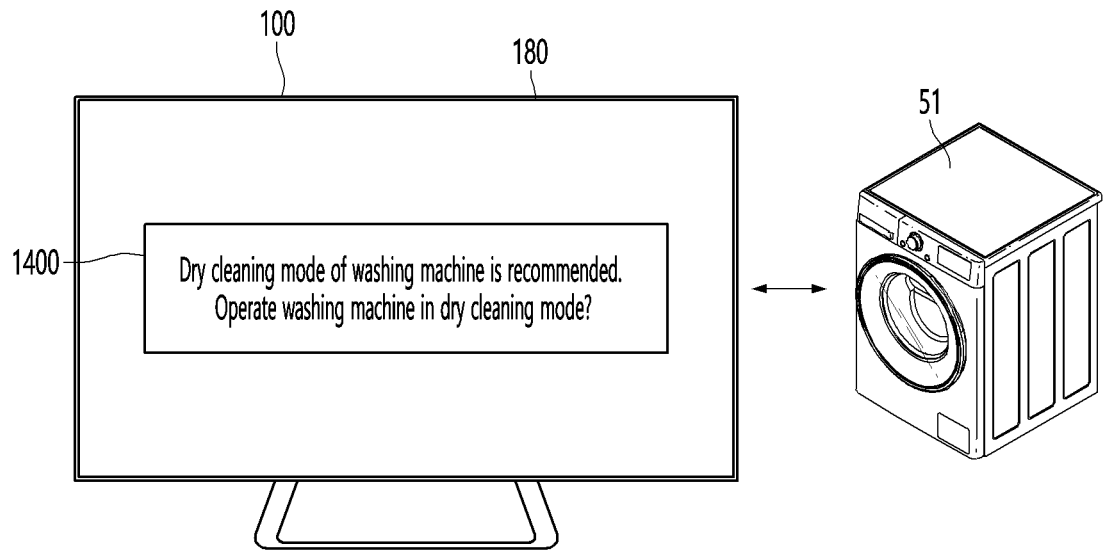
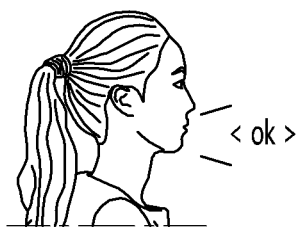
FIG. 19
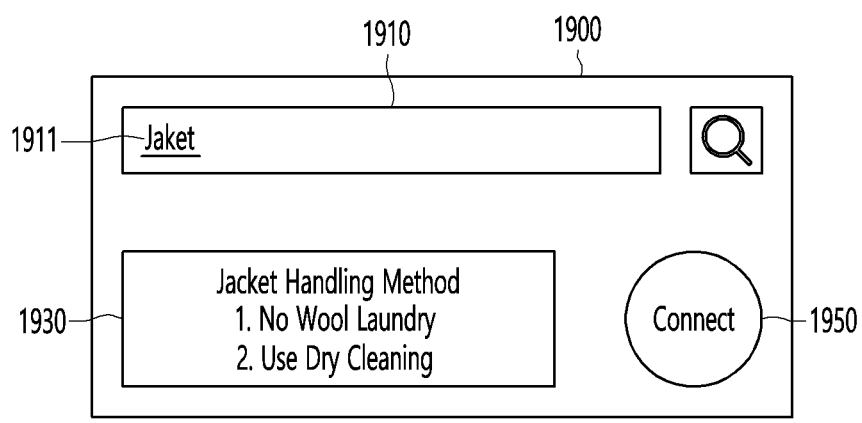

DISPLAY DEVICE AND ARTIFICIAL INTELLIGENCE SERVER CAPABLE OF CONTROLLING HOME APPLIANCE THROUGH USER'S VOICE BASED ON PURCHASE HISTORY LIST

CROSS REFERENCE TO RELATED APPLICATIONS

This application is the National Phase of PCT International Application No. PCT/KR2019/010447, filed on Aug. 16, 2019, all of which is hereby expressly incorporated by reference into the present application.

TECHNICAL FIELD

The present invention relates to a display device and an artificial intelligence server capable of controlling a home appliance through a user's voice.

BACKGROUND ART

Digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users can actively select the types of watching programs, the watching time, and the like. The IPTV and smart TV services can provide various additional services, such as Internet search, home shopping, and online games, based on such interactivity.

While watching TV, a user often operates other home appliances provided in the house according to the viewing situation of the TV.

Recently, a service that can control the operation of home appliances by using a voice recognition function of a TV while watching the TV has appeared.

That is, a user can control the operation of the home appliance by uttering the name of the home appliance and the operation of the home appliance.

However, since the home appliance has various functions, it is difficult for a user to understand all functions of the home appliance.

Therefore, there is a need for a method of identifying a function of a home appliance according to a user's intention and recommending a function suitable for the intention.

DISCLOSURE OF INVENTION

Technical Problem

The present invention aims to provide a display device capable of interlocking an operation of a home appliance suitable for a handling method based on an object handling method.

The present invention aims to allow a user to efficiently handle an object by reflecting a corresponding matter even if the user replaces a home appliance or a home appliance is updated.

Technical Solution

A display device for controlling a home appliance by using voice recognition according to an embodiment of the present invention may include a display unit, a wireless communication unit configured to wirelessly communicate with the home appliance, and a control unit configured to: receive a voice command; when the intention of the received voice command is to request an object handling method, determine an operation mode of the home appliance for handling an object based on information of the object; and transmit, to the home appliance, a control command for operating the home appliance in the determined operation mode.

An artificial intelligence server for controlling a home appliance by using voice recognition according to an embodiment of the present invention may include a memory configured to store object information, a communication unit configured to receive a voice command from a display device, and a processor configured to: when the intention of the received voice command is to request an object handling method, determine an operation mode of the home appliance for handling an object based on object information; and transmit, to an external server, a control command for operating the home appliance in the determined operation mode.

Advantageous Effects

According to various embodiments of the present disclosure, an operation mode of a home appliance optimized for handling an object may be set only by uttering a voice command for handling an object. Therefore, a user can efficiently manage the object without needing to know all the functions of the corresponding home appliance.

In addition, even if the home appliance is replaced or updated, the user may set an operation mode of the home appliance suitable for handling the object by taking into account the change.

BRIEF DESCRIPTION OF DRAWINGS

FIGS. 8 and 9 are views for describing a process in which a user receives information about an object of interest while watching a broadcast program, according to an embodiment of the present invention.

FIGS. 12 to 15 are views for describing a process of controlling an operation of a home appliance suitable for handling an object purchased by a user, according to an embodiment of the present invention.

FIGS. 17 and 18 are views for describing a process in which a display device directly controls an operation of a home appliance suitable for handling an object purchased by a user.

FIG. 19 is a view for describing a process of obtaining a handling method of an object and transmitting the obtained handling method to an external server according to an embodiment of the present invention.

BEST MODE FOR CARRYING OUT THE INVENTION

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
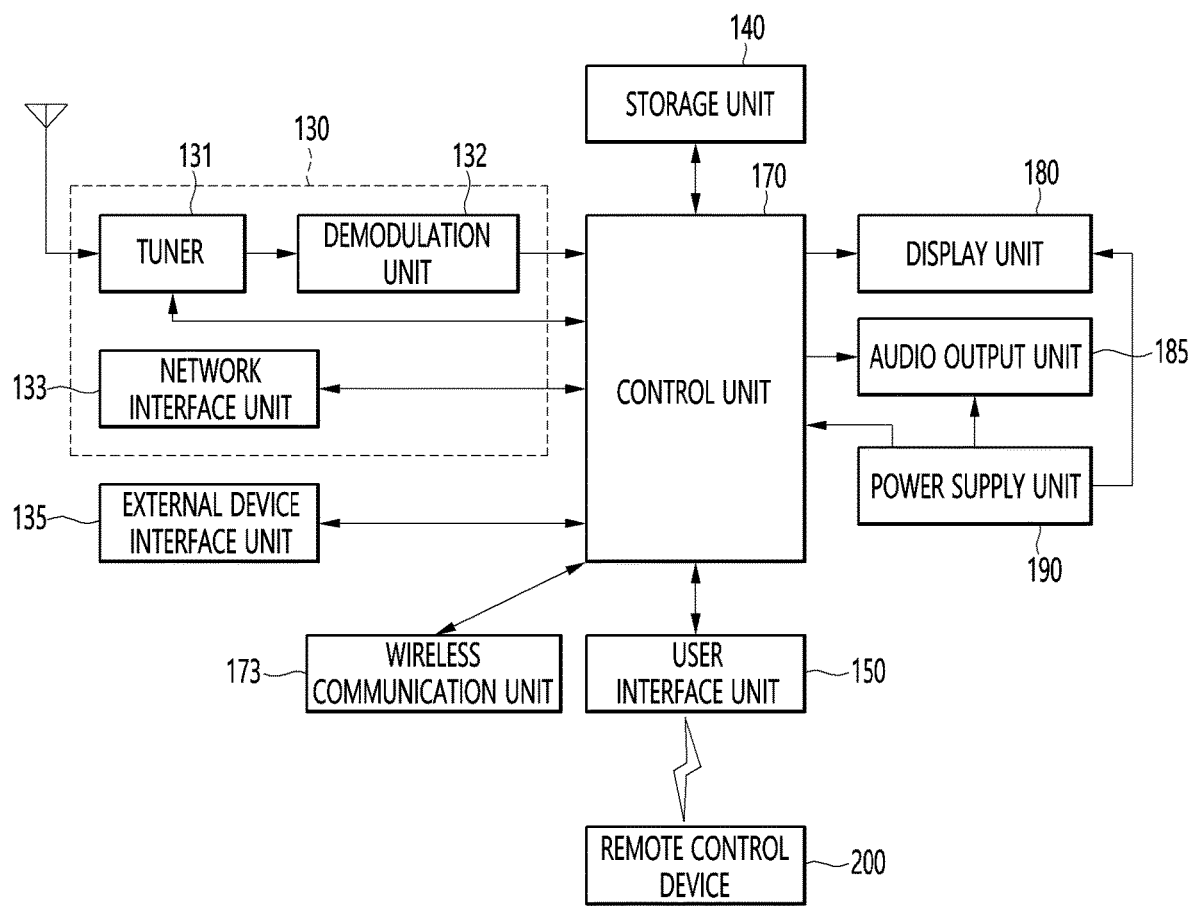
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals input by a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100.

Additionally, the control unit 170 can control the display device 100 by a user command or internal program input through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
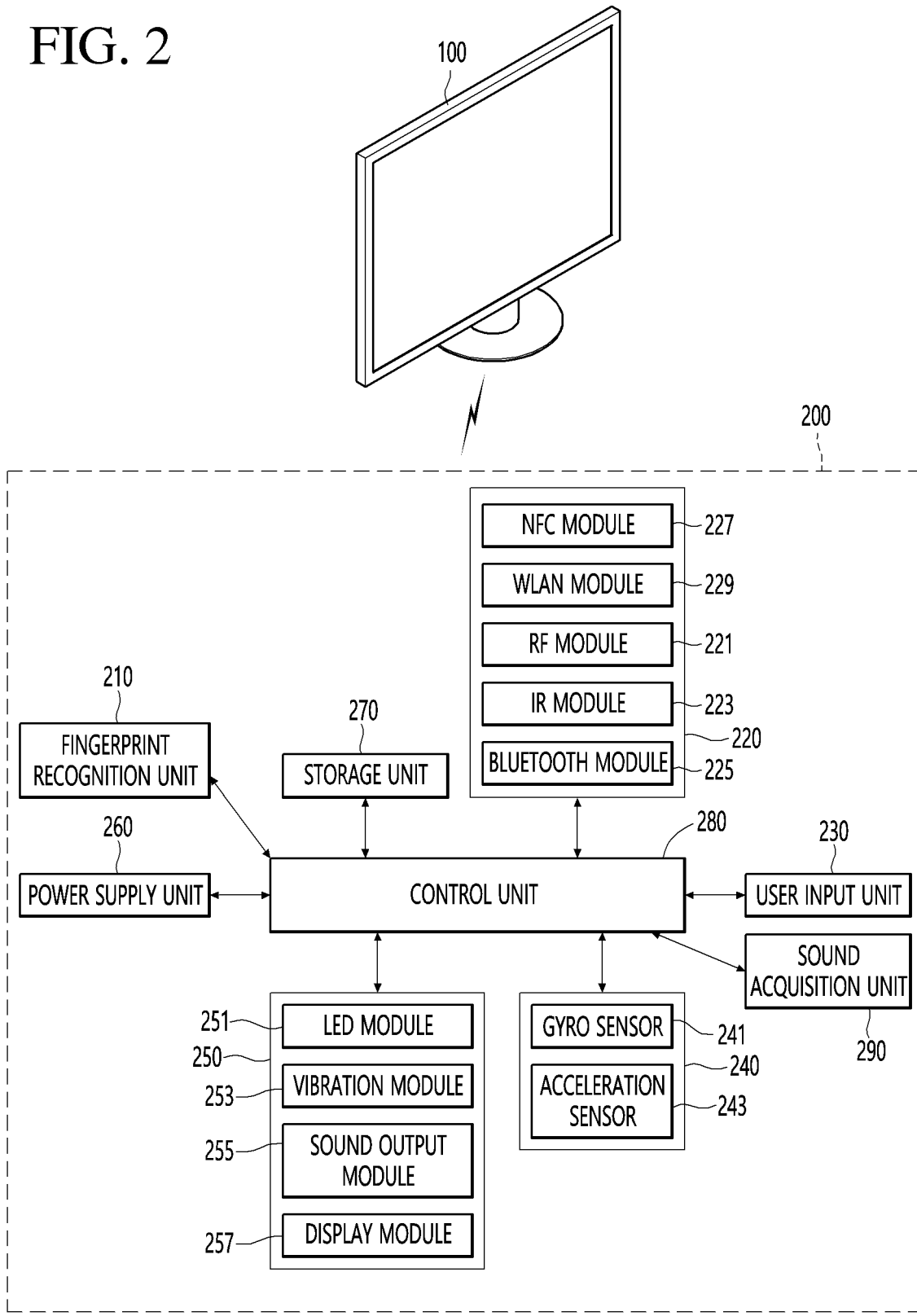
FIG. 2 is a block diagram illustrating a remote control device according to an embodiment of the present disclosure.
Figure 3:
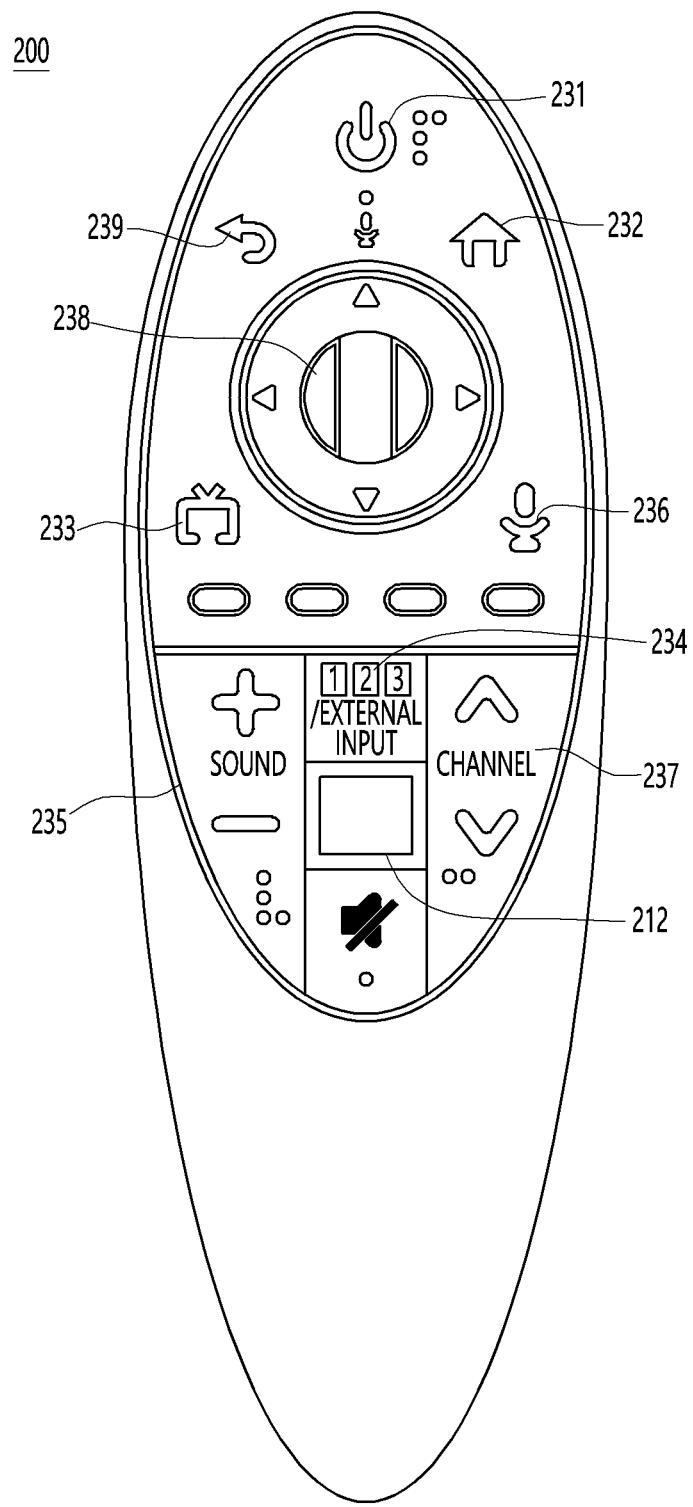
FIG. 3 is a view illustrating an actual configuration of a remote control device according to an embodiment of the present disclosure.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice.

The sound acquisition unit 290 can include at least one microphone and obtain voice through the microphone 291.

Figure 4:
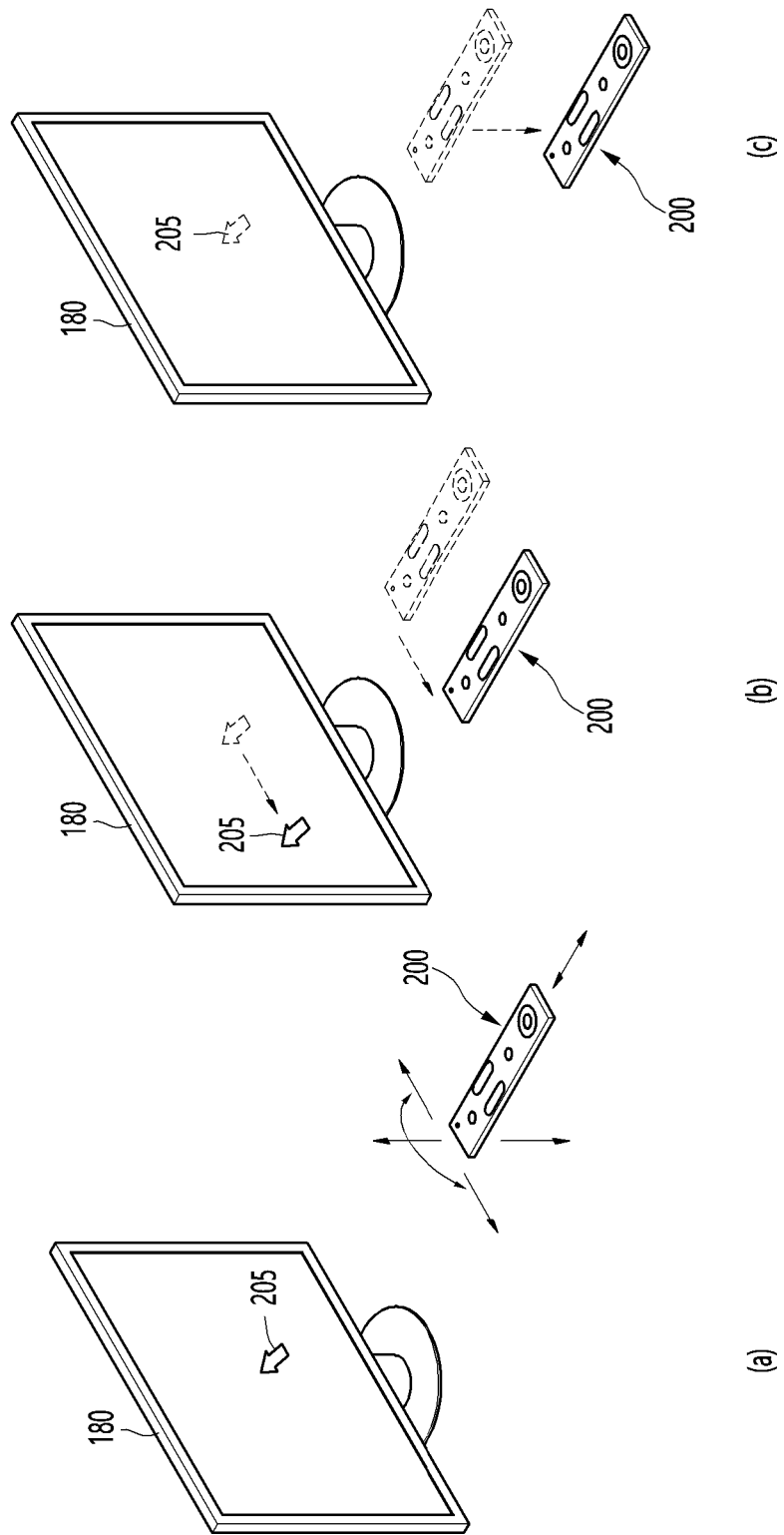
FIG. 4 is a view illustrating an example of utilizing a remote control device according to an embodiment of the present invention.

Next, FIG. 4 is described.

FIG. 4 is a view of utilizing a remote control device according to an embodiment of the present invention.

FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
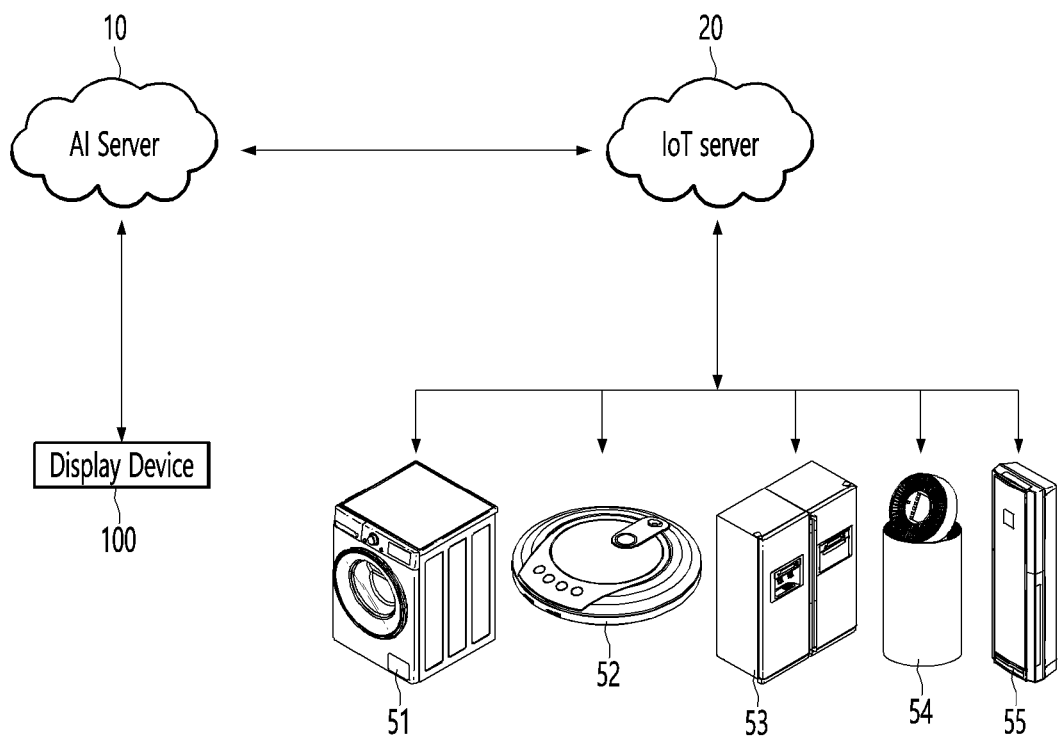
FIG. 5 is a view for describing an artificial intelligence (AI) system according to an embodiment of the present invention.

FIG. 5 is a view for describing an artificial intelligence (AI) system according to an embodiment of the present invention.

An AI system 5 can include a display device 100, an AI server 10, an IoT server 20, and a plurality of home appliances 51 to 55.

The display device 100 can wirelessly communicate with the AI server 10.

The display device 100 can transmit viewing pattern information to the AI server 10.

The display device 100 can periodically transmit viewing pattern information to the AI server 10. A transmission period may be one week, but this is just exemplary.

The IoT server 20 can periodically transmit usage pattern information of one or more home appliances to the AI server 10. The home appliances can be one of a washing machine 51, a robot cleaner 52, a refrigerator 53, an air purifier 54, and an air conditioner 55.

The AI server 10 can learn a correlation between the viewing pattern and the usage pattern by using the viewing pattern information and the usage pattern information.

The AI server 10 can obtain a usage pattern inference model that has been learned according to the learning result. The usage pattern inference model may be an artificial neural network-based model learned through a deep learning algorithm or a machine learning algorithm.

The display device 100 can receive a viewing event and transmit the received viewing event to the AI server 10.

The AI server 10 may determine the usage pattern of one or more home appliances from the viewing event by using the usage pattern inference model.

The AI server 10 can transmit, to the display device 100, usage recommendation information for one or more home appliances based on the determined usage pattern of one or more home appliances.

The display device 100 can output the received usage recommendation information.

The display device 100 can transmit a request for the usage recommendation request to the AI server 10.

The AI server 10 can transmit, to the IoT server 20, a control command for performing an operation corresponding to the usage recommendation information in response to a request for the usage recommendation operation from the display device 100.

The IoT server 20 can transmit, to the corresponding home appliance, an operation command for controlling the operation of the corresponding home appliance according to the received control command.

The corresponding home appliance may perform a specific function suitable for the viewing pattern according to the operation command received from the IoT server 20.

Figure 6:
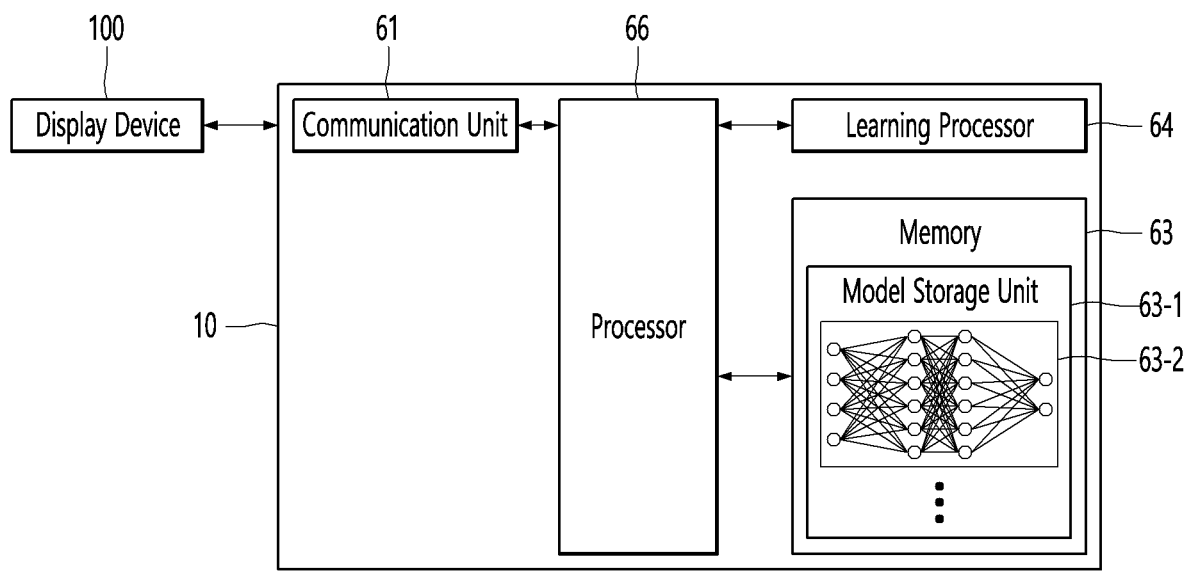
FIG. 6 is a block diagram for describing the configuration of the AI server according to an embodiment of the present invention.

FIG. 6 is a block diagram for describing the configuration of the AI server according to an embodiment of the present invention.

Referring to FIG. 6, the AI server 10 can refer to a device that learns an artificial neural network by using a machine learning algorithm or uses a learned artificial neural network. The AI server 10 can be configured with a plurality of servers to perform distributed processing, and can be defined as a 5G network. In this case, the AI server 10 can be included as a part of the display device 100 to perform at least a part of AI processing together.

The AI server 10 can include a communication unit 61, a memory 63, a learning processor 64, and a processor 66.

The communication unit 61 may transmit or receive data to or from an external device such as the display device 100.

The memory 63 can include a model storage unit 63-1. The model storage unit 63-1 may store a model (or an artificial neural network 63-2) that is being learned or is learned through the learning processor 64.

The learning processor 64 can learn the artificial neural network 63-2 by using training data. The learning model can be used while being mounted on the AI server 10 of the artificial neural network, or can be used while being mounted on the external device such as the display device 100.

The learning model can be implemented as hardware, software, or a combination of hardware and software. When all or part of the learning model is implemented as software, one or more instructions constituting the learning model can be stored in the memory 63.

The processor 660 can infer a result value for new input data by using the learning model and generate a response or a control command based on the inferred result value.

Figure 7:
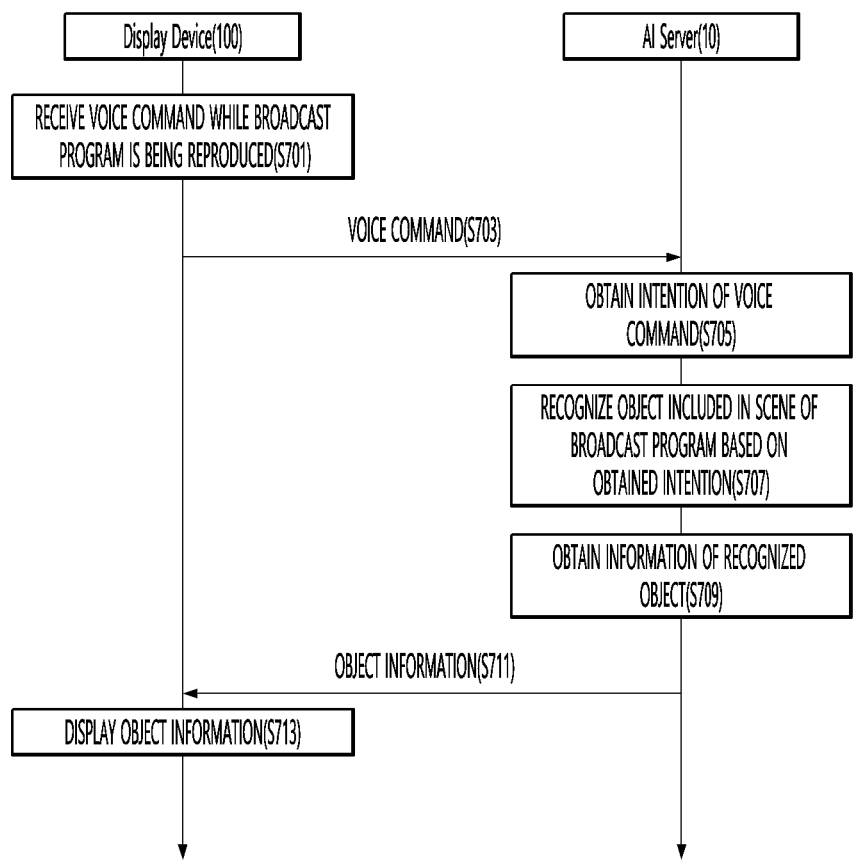
FIG. 7 is a ladder diagram for an operating method of an AI system according to an embodiment of the present invention.

Then, referring to FIG. 7, an operating method of a system according to an embodiment of the present invention is described.

FIG. 7 is a ladder diagram for an operating method of an AI system according to an embodiment of the present invention.

The control unit 170 of the display device 100 receives a voice command uttered by a user while a broadcast program is being reproduced (S701).

The control unit 170 can receive the voice command through the microphone provided in the user input interface unit 150.

As another example, the control unit 170 can receive, from the remote control device 200, the voice command received by the remote control device 200.

In practice, what the display device 100 receives may be a voice signal corresponding to the voice command.

The control unit 170 transmits the received voice command to the artificial intelligence server 10 through the network interface unit 133 (S703).

The control unit 170 can transmit the voice command to the artificial intelligence server 10 for intention analysis of the received voice command.

In an embodiment, the control unit 170 can transmit a scene of a broadcast program being reproduced to the artificial intelligence server 10 together with the voice command at the time point when the voice command is received.

The processor 66 of the artificial intelligence server 10 obtains the intention of the voice command (S705).

The processor 66 of the artificial intelligence server 10 can convert the voice signal of the voice command into text by using an STT engine.

The processor 66 can obtain the intention of the converted text by using a natural language processing engine.

The processor 66 of the artificial intelligence server 10 recognizes an object included in the scene of the broadcast program based on the obtained intention (S707), and obtains information about the recognized object (S709).

The processor 66 can recognize an object matching the obtained intention among a plurality of objects included in the scene of the broadcast program.

The processor 66 can recognize an object matching the intention of the voice command by using an image recognition model.

For example, when the intention of the voice command is to request information about the clothes a specific person is wearing, the processor 66 can recognize the clothes worn by the specific person included in the scene of the broadcast program.

The processor 66 can receive information about the recognized clothes from a clothing purchase server (not illustrated).

The object information may include at least one of a model name of the object, a name of the broadcast program in which the object appears, a name of an actor wearing the object, and an object handling method.

The image recognition model may be an artificial neural network-based model learned by a deep learning algorithm or a machine learning algorithm.

The image recognition model can be learned through supervised learning. The image recognition model can recognize a specific person image included in image data.

The training data set used for learning the image recognition model may include person image data and person identification data for identifying a person labeled therewith.

The person identification data may be a person's name, nickname, or the like.

The processor 66 of the artificial intelligence server 10 can obtain information of the broadcast program by using an auto content recognition (ACR) technique. The information of the broadcast program may include a name of the broadcast program, information about characters of the broadcast program, and an airing time of the broadcast program.

The processor 66 of the artificial intelligence server 10 transmits the obtained object information through the communication unit 61 to the display device 100 (S711).

The control unit 170 of the display device 100 displays the information about the object received from the artificial intelligence server 10 on the display unit 180 (S713).

Figure 9:
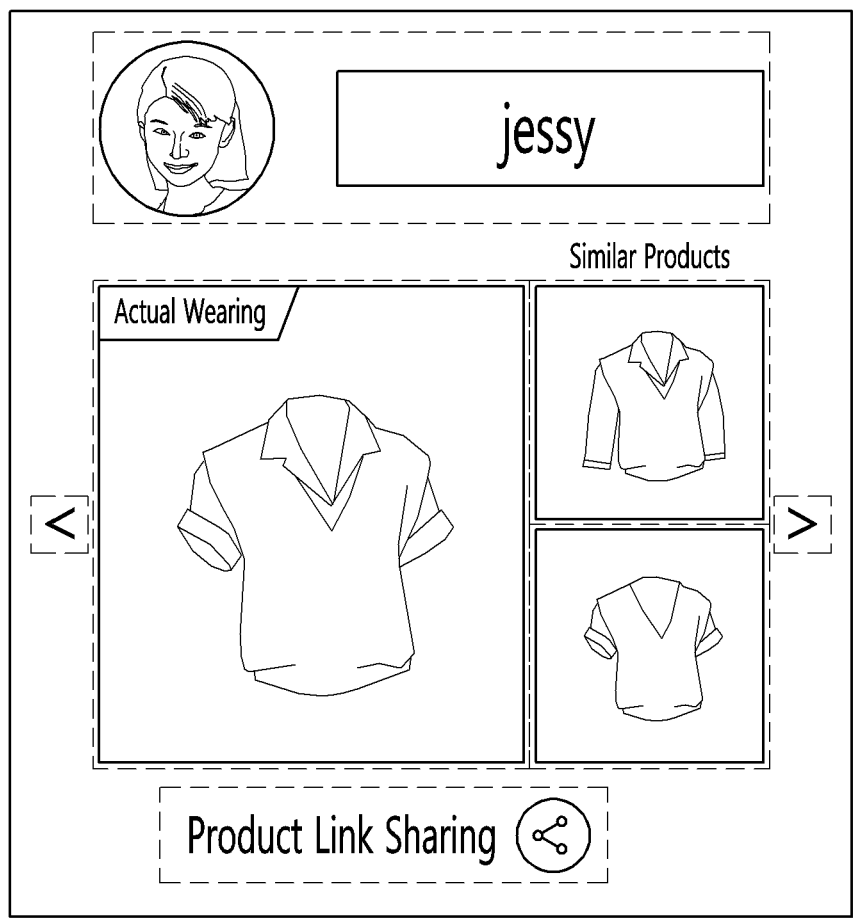

FIGS. 8 and 9 are views for describing a process in which a user receives information about an object of interest while watching a broadcast program, according to an embodiment of the present invention.

First, FIG. 8 is described.

The display unit 180 of the display device 100 is reproducing a broadcast program 800.

While watching the broadcast program 800, a user utters a voice command of <What is the clothes Jessy is wearing>.

The display device 100 can receive a voice command uttered by the user, extract a scene of the broadcast program at the time of receiving the voice command, and transmit the scene of the broadcast program and the voice command to the AI server 200.

The AI server 10 can search for information about an object that a user wants to obtain, based on the voice command and the scene of the broadcast program.

Specifically, the AI server 10 can identify the intention of the voice command as an intention to request information about the clothes worn by a specific person included in the scene.

The AI server 10 can recognize the clothes worn by the specific person from the scene of the broadcast program by using the image recognition model.

The AI server 10 can transmit image data regarding the recognized clothes to the search server 880 to obtain information about the clothes from the search server.

FIG. 9 is a view for describing the obtained information about the object.

The AI server 10 can automatically search for the recognized clothes to obtain information 900 about the clothes.

The information 900 about the clothes may include one or more of thumbnail images of clothes, names of clothes, model names of clothes, prices of clothes, websites where clothes can be purchased, and images of clothes of types similar to the corresponding clothes.

The information 900 about the clothes can be transmitted to the display device 100 and displayed through the display unit 180.

The user can purchase the clothes by using the information 900 about the clothes. That is, the user can purchase the clothes by accessing a website where the clothes can be purchased.

The information about the object purchased by the user can be stored in the AI server 10 or the display device 100.

As such, the user can quickly and accurately check information about a specific object only by uttering a simple voice command while watching the broadcast program.

Figure 10:
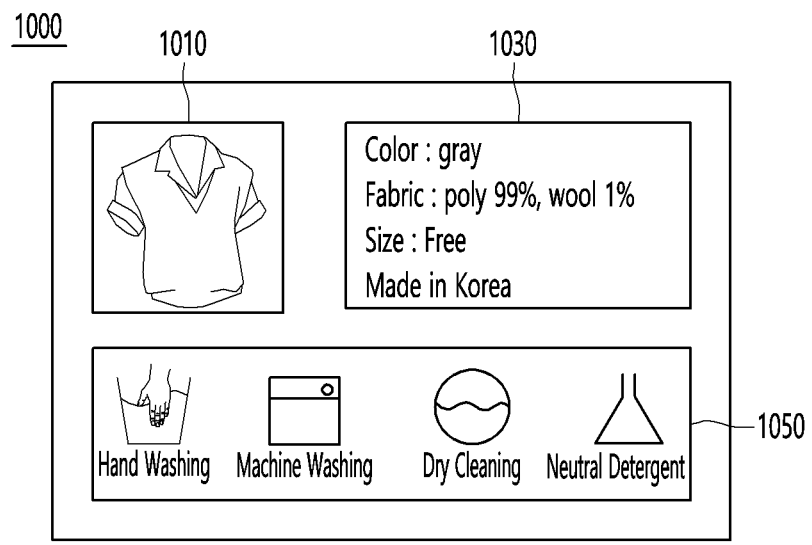
FIG. 10 illustrates information about an object purchased while a user watches a broadcast program, according to an embodiment of the present invention.

FIG. 10 illustrates information about an object purchased while a user watches a broadcast program, according to an embodiment of the present invention.

Object information 1000 can be stored in the storage unit 140 of the display device 100 or the memory 63 of the AI server 10.

The object information 1000 can include a thumbnail image 1010 of the object, characteristic information 1030 of the object, and handling information 1050 of the object.

The characteristic information 1030 of the object can include the color of the object, the mixing ratio of materials, the size, and the country of manufacture of the object.

The handling information 1050 of the object can include handling guide images and texts indicating precautions when washing the object.

Figure 11:
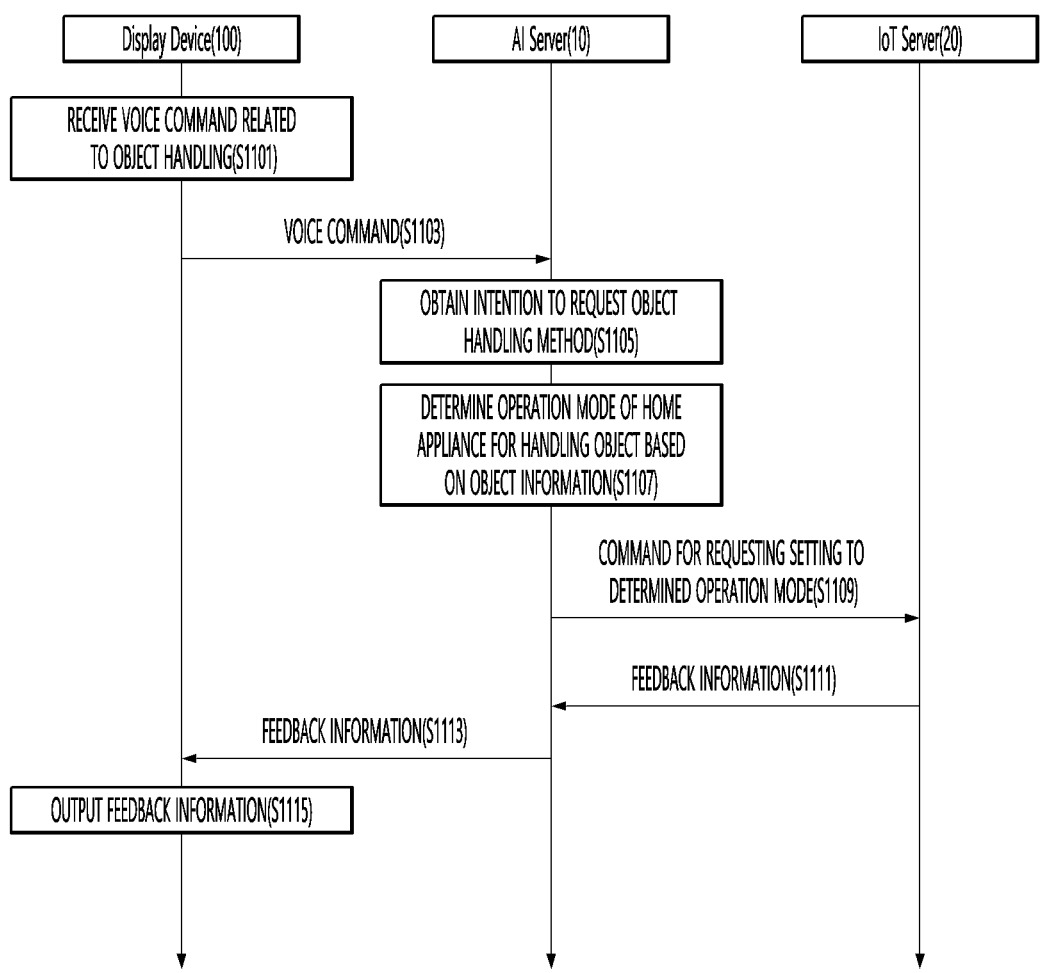
FIG. 11 is a ladder diagram for describing an operating method of an artificial intelligence system according to another embodiment of the present invention.

FIG. 11 is a ladder diagram for describing an operating method of an artificial intelligence system according to another embodiment of the present invention.

Referring to FIG. 11, the control unit 170 of the display device 100 receives a voice command related to handling of an object (S1101).

The control unit 170 can receive a command for requesting a purchase history of a purchased object through the display device 100. The control unit 170 can display a purchase history list indicating a purchase history of an object on the display unit 180 according to the received command.

The control unit 170 can receive a voice command related to handling of a specific object included in the purchase history list.

The control unit 170 of the display device 100 transmits the voice command to the AI server 10 through the network interface unit 133 (S1103).

Specifically, the control unit 170 can transmit a voice signal corresponding to the voice command to the AI server 10.

The processor 66 of the AI server 10 obtains an intention to request an object handling method from the received voice command (S1105).

The processor 66 can obtain the intention of the voice command by using the natural language processing engine. The intention of the voice command is an intention to request an object handling method. When the object is clothes, the object handling method can indicate a clothes washing method.

The processor 66 of the AI server 10 determines an operation mode of the home appliance for handling the object based on the object information (1107).

The processor 66 can determine an operation mode for an optimal object handling method from among a plurality of operation modes of the home appliance based on the object information stored in the memory 63.

For example, when the object is clothes, the processor 66 can determine an operation mode suitable for the object handling method from among the operation modes of the washing machine 51 based on the object handling method included in the object information.

To this end, the processor 66 can collect, from the IoT server 20, and store information of the home appliances 51 to 55 connected to the IoT server 20 in advance.

The information of each home appliance may include one or more of a name of the home appliance, operation modes of the home appliance, and a current operating state of the home appliance.

When the home appliance is replaced or the home appliance is updated, this change can be collected by the IoT server 20, and the AI server 10 can store information about the collected change in the memory 63.

The processor 66 can select a device suitable for handling the objects of the plurality of home appliances 51 to 55 and determine one of the operation modes of the selected home appliance based on the object handling method.

The processor 66 of the AI server 10 transmits a command for requesting setting to the determined operation mode to the IoT server 20 through the communication unit 61 (S1109).

The IoT server 20 can transmit the command received from the AI server 10 to the corresponding home appliance.

The processor 66 of the AI server 10 receives feedback information indicating the state information of the home appliance from the IoT server 20 in response to the command transmitted through the communication unit 61 (S1111).

The IoT server 20 can receive feedback information indicating a result of executing the command from the home appliance, and can transmit the received feedback information to the AI server 10.

The processor 66 of the AI server 10 transmits the feedback information received from the IoT server 20 to the display device 100 through the communication unit 61 (S1113).

The control unit 170 of the display device 100 outputs the feedback information received from the AI server 10 (S1115).

The control unit 170 can display the feedback information through the display unit 180, or may output the feedback information as audio through the audio output unit 185.

Hereinafter, the embodiment of FIG. 11 will be described in more detail.

FIGS. 12 to 15 are views for describing a process of controlling an operation of a home appliance suitable for handling an object purchased by a user, according to an embodiment of the present invention.

First, FIG. 12 is described.

Referring to FIG. 12, the display unit 180 of the display device 100 displays a purchase history list 1200 indicating purchase histories of objects purchased by a user.

The display device 100 can receive a command for requesting a purchase history, and can display the purchase history list 1200 according to the received command.

The purchase history list 1200 can include purchase information about objects purchased by the user through the display device 100.

The purchase information can include a purchase date, a name of a broadcast program in which the object appeared, a name of an actor wearing the object, a name of the object, and a website where the object has been purchased.

The purchase history list 1200 can further include purchase information of an object purchased through a mobile terminal such as a user's smartphone as well as an object purchased through the display device 100. To this end, the display device 100 can receive, from the smartphone, the purchase history of the object through the user's smartphone.

The display device 100 can receive a voice command requesting handling of a specific object while the purchase history list 1200 is displayed. For example, the voice command can be <Jessy, how do you wash your clothes?>.

The display device 100 can transmit the received voice command to the AI server 10.

The AI server 10 can use a natural language processing engine to identify the intention of the received voice command. The AI server 10 can obtain the method of washing the corresponding clothes based on the identified intention.

The AI server 10 can search for a clothes washing/handling method suitable for the user's intention from the clothes information previously stored in the memory 63.

FIG. 13 illustrates clothes washing/handling information 1300 matching the user's intention obtained by the AI server 10.

The washing/handling information can include a washing method, a drying method, a styler usage method, and handling precautions.

The AI server 10 can select a washing machine from among a plurality of home appliances provided in the house as a device for handling the corresponding clothes.

The AI server 10 can determine one of the operation modes by using the washing/handling information 1300 and the operation modes of the washing machine 51.

The AI server 10 can receive information about the operation modes of the washing machine 51 through the IoT server 20.

When the washing/handling information 1300 includes dry cleaning, the AI server 10 can determine a dry cleaning mode from among a plurality of operation modes of the washing machine 51 as an operation mode for handling the clothes.

Figure 14:
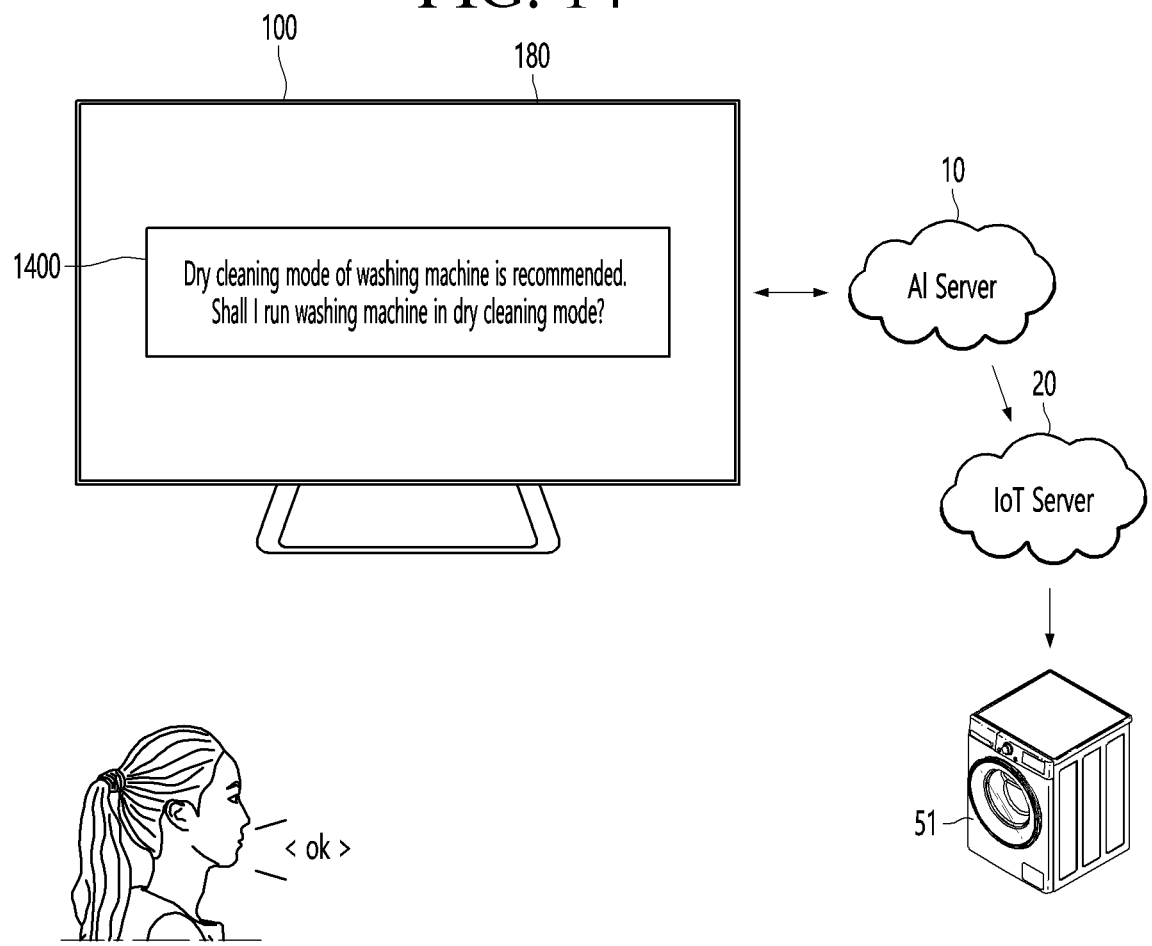

Referring to FIG. 14, the AI server 10 can generate recommended operation information for recommending a dry cleaning mode, which is a mode suitable for washing clothes, and can transmit the generated recommended operation information to the display device 100.

The display device 100 can display the recommended operation information 1400 on the display unit 180.

The display device 100 can receive a voice command requesting an operation in the dry cleaning mode according to the recommended operation information 1400, and can transmit the received voice command to the AI server 10.

The AI server 10 can transmit, to the IoT server 20, a control command for setting the operation mode of the washing machine 51 to the dry cleaning mode in response to the received voice command. The IoT server 20 can transmit the received control command to the washing machine 51, and the washing machine 51 can set the operation mode to the dry cleaning mode according to the received control command.

On the other hand, according to another embodiment of the present invention, when the operation mode of the home appliance corresponding to the intention of the voice command is determined, the AI server 10 can transmit, to the IoT server 20, a control command requesting setting to the determined operation mode.

Figure 15:
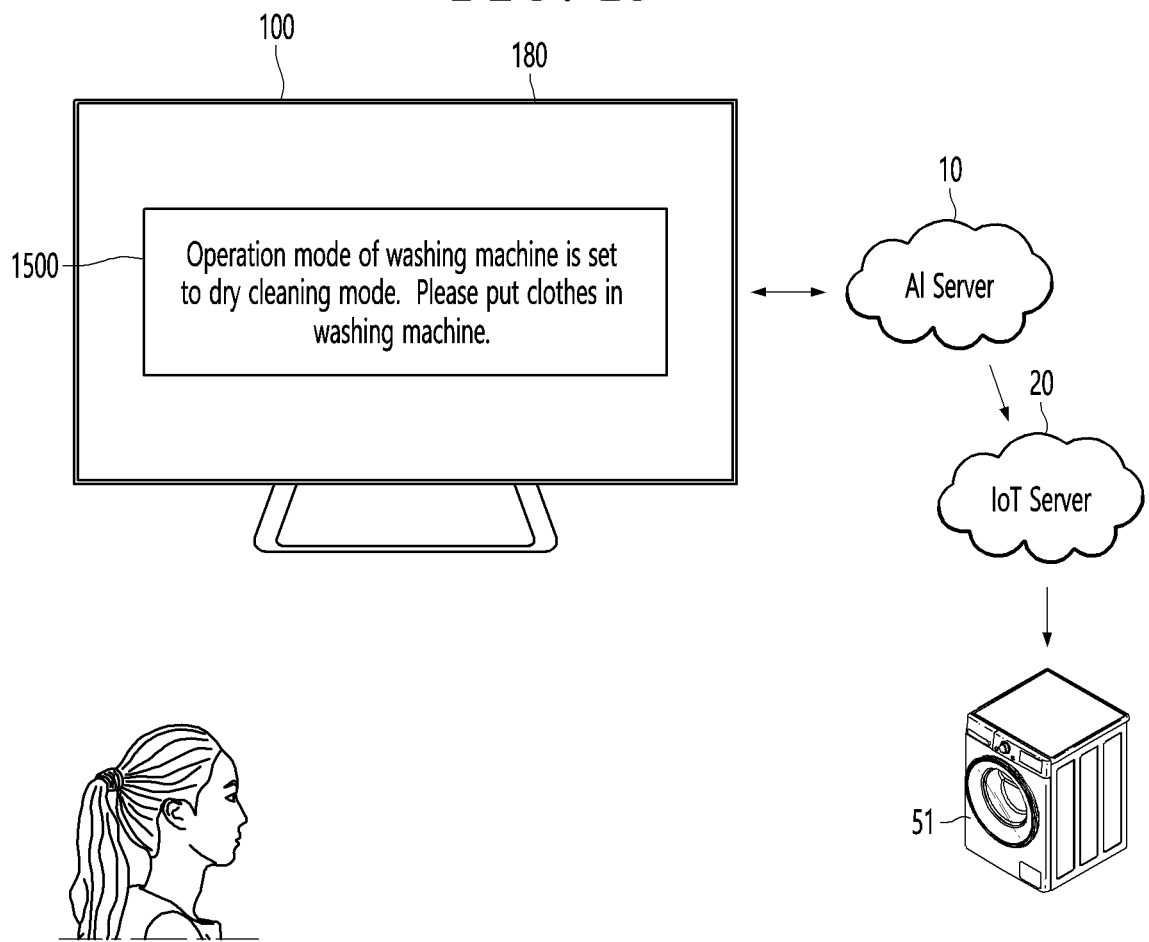

Referring to FIG. 15, the AI server 10 can transmit, to the IoT server 20, a control command for setting the operation mode of the washing machine 51 to the dry cleaning mode. The IoT server 20 can transmit the received control command to the washing machine 51.

The washing machine 51 can set the operation mode to the dry cleaning mode and can transmit, to the IoT server 20, feedback information indicating that the operation mode has been set to the dry cleaning mode.

The IoT server 20 can transmit the received feedback information to the AI server 10, and the AI server 10 can transmit the feedback information to the display device 100.

The display device 100 can display the received feedback information 1500 on the display unit 180.

The user can receive a guide on how to wash the purchased clothes through the feedback information 1500.

As such, according to an embodiment of the present invention, the user can receive a guide for effectively handling an object by reflecting the characteristics of the home appliance only by uttering a simple voice command.

Therefore, there is an effect that the user can easily handle the object without the effort of searching.

Figure 16:
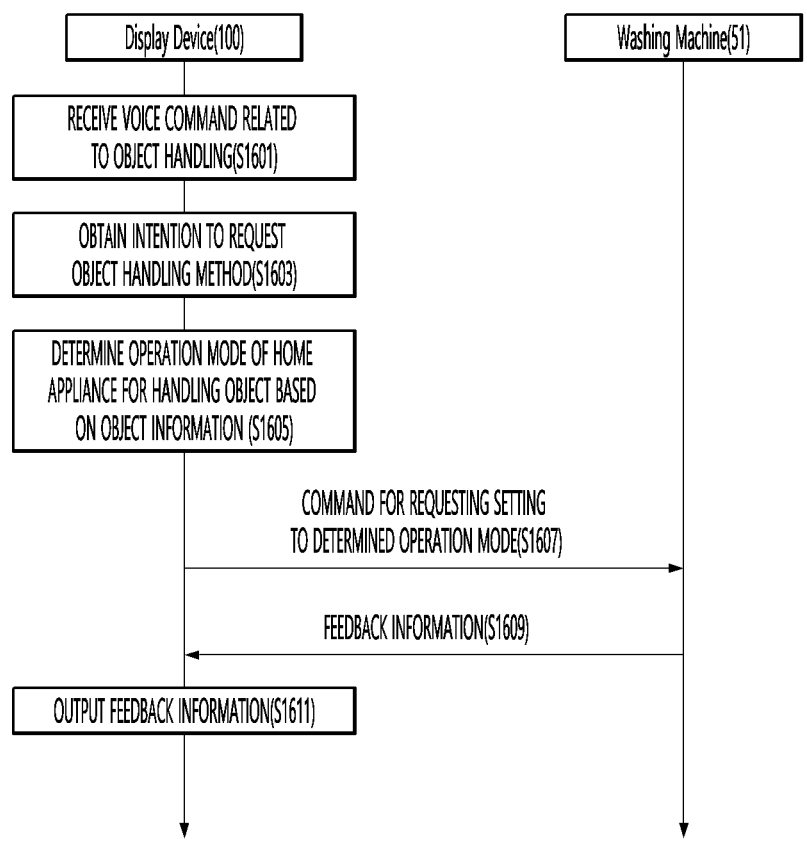
FIG. 16 is a flowchart for describing an operating method of an artificial intelligence system according to another embodiment of the present invention.

FIG. 16 is a flowchart for describing an operating method of an artificial intelligence system according to another embodiment of the present invention.

In particular, FIG. 16 is a view for describing a process in which the display device 100 controls the home appliance without passing through an external server.

Referring to FIG. 16, the control unit 170 of the display device 100 receives a voice command related to handling of an object (S1601).

The control unit 170 can receive a command for requesting a purchase history of a purchased object through the display device 100. The control unit 170 can display a purchase history list indicating a purchase history of an object on the display unit 180 according to the received command.

The control unit 170 can receive a voice command related to handling of a specific object included in the purchase history list.

The control unit 170 of the display device 100 obtains an intention to request an object handling method from the received voice command (S1603).

The control unit 170 can obtain the intention of the voice command by using a natural language processing engine. The intention of the voice command is an intention to request an object handling method. When the object is clothes, the object handling method can indicate a clothes washing method.

The control unit 170 of the display device 100 determines an operation mode of the home appliance for handling the object based on the object information (1605).

The control unit 170 can determine an operation mode for an optimal object handling method from among a plurality of operation modes of the home appliance based on the object information stored in the storage 140.

For example, when the object is clothes, the control unit 170 can determine an operation mode suitable for the object handling method from among the operation modes of the washing machine 51 based on the object handling method included in the object information.

To this end, the control unit 170 can collect, from the IoT server 20, and store information of the home appliances 51 to 55 connected to the IoT server 20 in advance.

The information of each home appliance may include one or more of a name of the home appliance, operation modes of the home appliance, and a current operating state of the home appliance.

The control unit 170 can select a device suitable for handling the objects of the plurality of home appliances 51 to 55 and can determine one of the operation modes of the selected home appliance based on the object handling method.

The control unit 170 of the display device 100 transmits a command for requesting setting to the determined operation mode to the IoT server 51 through the communication unit 173 (S1607).

The control unit 170 of the display device 100 receives, from the washing machine 51, feedback information indicating the state information of the washing machine 51 in response to the transmitted command (S1609).

The display device 100 can receive, from the washing machine 51, feedback information indicating a result of executing the command.

The control unit 170 of the display device 100 outputs the feedback information received from the washing machine 51 (S1611).

The control unit 170 can display the feedback information through the display unit 180, or may output the feedback information as audio through the audio output unit 185.

FIGS. 17 and 18 are views for describing a process in which a display device directly controls an operation of a home appliance suitable for handling an object purchased by a user.

Referring to FIG. 17, the display unit 180 of the display device 100 displays a purchase history list 1200 indicating purchase histories of objects purchased by a user.

The display device 100 can receive a command for requesting a purchase history, and can display the purchase history list 1200 according to the received command.

The purchase history list 1200 can include purchase information about objects purchased by the user through the display device 100.

The purchase information can include a purchase date, a name of a broadcast program in which the object appeared, a name of an actor wearing the object, a name of the object, and a website where the object has been purchased.

The display device 100 can receive a voice command requesting handling of a specific object while the purchase history list 1200 is displayed. For example, the voice command can be <Jessy, how do you wash your clothes?>.

The display device 100 can use a natural language processing engine to identify the intention of the received voice command.

The display device 100 can obtain the method of washing the corresponding clothes based on the identified intention.

The display device 100 can search for a clothes washing/handling method suitable for the user's intention from the clothes information previously stored the storage unit 140.

The clothes washing/handling information suitable for the user's intention is illustrated in the embodiment of FIG. 13.

The washing/handling information can include a washing method, a drying method, a styler usage method, and handling precautions.

The display device 100 can select a washing machine 51 from among a plurality of home appliances provided in the house as a device for handling the corresponding clothes.

The display device 100 can determine one of the operation modes by using the washing/handling information 1300 and the operation modes of the washing machine 51.

When the washing/handling information 1300 includes dry cleaning, the display device 100 can determine a dry cleaning mode from among a plurality of operation modes of the washing machine 51 as an operation mode for handling the clothes.

Referring to FIG. 18, the display device 100 can generate recommended operation information 1400 for recommending a dry cleaning mode, which is a mode suitable for washing clothes, and can display the generated recommended operation information 1400 on the display unit 180.

The display device 100 can receive a voice command requesting an operation in the dry cleaning mode according to the recommended operation information 1400, and can transmit a control command corresponding to the received voice command to the washing machine 51.

The washing machine 51 can set the operation mode to the dry cleaning mode according to the received control command.

As such, according to an embodiment of the present invention, the user can receive a guide for effectively handling an object by reflecting the characteristics of the home appliance only by uttering a simple voice command.

FIG. 19 is a view for describing a process of obtaining a handling method of an object and transmitting the obtained handling method to an external server according to an embodiment of the present invention.

Referring to FIG. 19, a website search screen 1900 is illustrated. The website search screen 1900 can be a screen displayed on the display unit 180 of the display device 100 or a screen displayed on a user's smartphone.

The search screen 1900 may include a search window 1910. A specific text 1911 may be input to the search window 1910. It is assumed that the text 1911 is <jacket>.

When a search request for the text 1911 is received, the display device 100 can display jacket washing/handling information 1930 corresponding to the text 1911.

At least one of a material mixing ratio of the jacket, a drying method, or a washing method can be obtained in the washing/handling information 1930.

On the other hand, when the search request for the text 1911 is received, the display device 100 may further display a link button 1950.

The link button 1950 can be a button used to transmit washing/handling information to the AI server 10 or the IoT server 20.

When the link button 1950 is selected, the display device 100 can transmit washing/handling information 1930 to one or more of the AI server 10 and the IoT server 20.

On the other hand, the display device 100 can store the washing/handling information 1930 in the storage unit 140.

Figure 20:
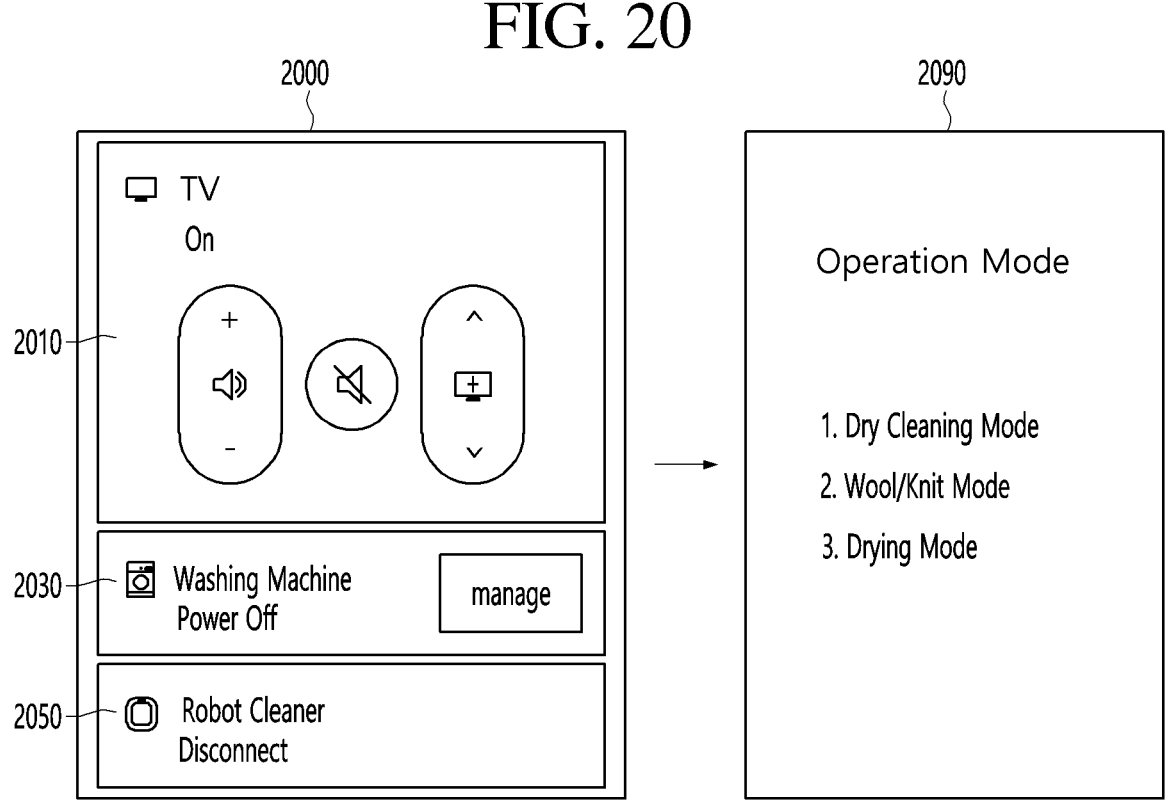
FIG. 20 is a view for describing a process of controlling an operation mode of a home appliance through an application for controlling the home appliance, according to an embodiment of the present invention.

FIG. 20 is a view for describing a process of controlling an operation mode of a home appliance through an application for controlling the home appliance, according to an embodiment of the present invention.

Referring to FIG. 20, the display device 100 displays an execution screen 2000 of a home appliance control application.

The execution screen 2000 can include a TV control item 2010 for controlling a TV, a washing machine control item 2030 for controlling an operation of a washing machine, and a robot cleaner control item 2050 for controlling a robot cleaner.

A management item 2070 for setting the operation mode of the corresponding home appliance may be displayed in each control item.

For example, when the management item 2070 adjacent to the washing machine control item 2030 is selected, the display device 100 can display a mode setting screen 2090 for setting the operation mode of the washing machine.

The mode setting screen 2090 can include a plurality of operation modes supported by the washing machine.

The user can simply set the operation mode of the washing machine through the mode setting screen 2090. When one of the plurality of operation modes is selected, the display device 100 can transmit, to the washing machine, a control command to operate according to the selected operation mode.

According to an embodiment of the present disclosure, the above-described method can be implemented with codes readable by a processor on a medium in which a program is recorded. Examples of the medium readable by the processor include a ROM, a RAM, a CD-ROM, a magnetic tape, a floppy disk, an optical data storage device, and the like, and can include those implemented in the form of carrier wave (for example, transmission over Internet).

The display device described above is not limitedly applicable to the configuration and method of the above-described embodiments, and the embodiments are configured by selectively combining all or part of each of the embodiments such that various modifications can be made.

The invention claimed is:

1. A display device for controlling a home appliance by using voice recognition, the display device comprising:
    a display unit;
    a wireless communication unit configured to wirelessly communicate with the home appliance; and
    a control unit configured to:
        receive a voice command;
        when an intention of the voice command is to request a handling method of one of a plurality of objects included in a purchase history list of a purchase made through the display unit, determine an operation mode of the home appliance for handling an object based on information of the object; and
        transmit, to the home appliance, a control command for operating the home appliance in the determined operation mode.

2. The display device of claim 1, further comprising a storage unit configured to store object information,
    wherein the object information includes one or more of an ingredient of the object, a washing method, a drying method, and handling precautions.

3. The display device of claim 2, wherein the control unit is configured to:
    compare the object information with a plurality of operation modes supported by the home appliance; and
    determine one of the plurality of operation modes according to a comparison result.

4. The display device of claim 1, wherein the control unit is configured to receive feedback information indicating that the home appliance is set to the determined operation mode from the home appliance through the wireless communication unit in response to the control command.

5. The display device of claim 4, wherein the control unit is configured to display the feedback information received from the home appliance on the display unit.

6. The display device of claim 1, wherein the control unit is configured to display recommended operation information for recommending the determined operation mode on the display unit.

7. The display device of claim 1, wherein the control unit is configured to display, on the display unit, the purchase history list indicating a history of objects purchased through the display device.

8. An artificial intelligence server for controlling a home appliance by using voice recognition, the artificial intelligence server comprising:
    a memory configured to store object information;
    a communication unit configured to receive a voice command from a display device; and
    a processor configured to:
        when an intention of the voice command is to request a handling method of one of a plurality of objects included in a purchase history list of a purchase made through the display unit, determine an operation mode of the home appliance for handling an object based on object information; and
        transmit, to an external server, a control command for operating the home appliance in the determined operation mode.

9. The artificial intelligence server of claim 8, wherein the object information includes one or more of an ingredient of the object, a washing method, a drying method, and handling precautions.

10. The artificial intelligence server of claim 9, wherein the processor is configured to:
    compare the object information with a plurality of operation modes supported by the home appliance;
    determine one of the plurality of operation modes according to a comparison result.

11. The artificial intelligence server of claim 10, wherein the processor is configured to receive information of the home appliance from the external server, and
    wherein the information of the home appliance includes a name of the home appliance, a model name of the home appliance, and a plurality of operation modes supported by the home appliance.

12. The artificial intelligence server of claim 8, wherein the processor is configured to receive feedback information indicating that the home appliance is set to the determined operation mode from the external server through the communication unit in response to the control command.

13. The artificial intelligence server of claim 12, wherein the processor is configured to transmit, to the display device, the feedback information received from the home appliance.

14. The artificial intelligence server of claim 8, wherein the processor is configured to transmit, to the display device, recommended operation information for recommending the determined operation mode.

* * * * *